(12) United States Patent
Lee

(10) Patent No.: US 9,312,712 B2
(45) Date of Patent: Apr. 12, 2016

(54) METHOD AND SYSTEM FOR CONTROLLING CHARGING PARAMETERS OF A BATTERY USING A PLURALITY OF TEMPERATURE RANGES AND COUNTERS AND PARAMETER SETS

(71) Applicant: Samsung SDI Co., Ltd., Yongin-si, Gyeonggi-do (KR)

(72) Inventor: Chulseung Lee, Yongin-si (KR)

(73) Assignee: Samsung SDI Co., Ltd., Gyeonggi-Do (KR)

(*) Notice: Subject to any disclaimer, the term of this patent is extended or adjusted under 35 U.S.C. 154(b) by 372 days.

(21) Appl. No.: 13/718,512

(22) Filed: Dec. 18, 2012

(65) Prior Publication Data

US 2014/0028267 A1 Jan. 30, 2014

Related U.S. Application Data

(60) Provisional application No. 61/676,220, filed on Jul. 26, 2012.

(51) Int. Cl.
*H02J 7/00* (2006.01)
*H01M 10/44* (2006.01)

(52) U.S. Cl.
CPC ........... *H02J 7/0052* (2013.01); *H01M 10/443* (2013.01); *H02J 7/0073* (2013.01);
(Continued)

(58) Field of Classification Search
CPC ........ Y02E 60/12; H02J 7/007; H02J 7/0077; H02J 7/088; H02J 7/0091; H02J 7/0042; H02J 7/0044; H02J 7/0045; H02J 7/0047
USPC .......... 320/127, 132–137, 148–153, 155–159
See application file for complete search history.

(56) References Cited

U.S. PATENT DOCUMENTS 4,194,146 A * 3/1980 Patry et al. .................... 320/136
5,196,780 A * 3/1993 Pacholok ...................... 320/148
(Continued)

FOREIGN PATENT DOCUMENTS

KR  10-2005-0046610 A  5/2005
KR  10-2009-0126097 A  12/2009
KR  10-2009-0126099 A  12/2009

OTHER PUBLICATIONS

Extended European Search Report dated Jan. 26, 2015 for European Patent Application No. EP 13 157 454.3 which claims priority from U.S. Appl. No. 61/676,220, filed Jul. 26, 2012, and captioned U.S. Appl. No. 13/718,512.

*Primary Examiner* — Stacy Whitmore
(74) *Attorney, Agent, or Firm* — Knobbe Martens Olson & Bear LLP

(57) ABSTRACT

A method of charging a battery and a battery pack utilizing the same, is disclosed. The method enhances the battery life characteristic of a battery cell by varying the charging parameters (e.g., charging voltage, charging current, rate of charge, relative state of charge, and battery capacity) based a temperature of or around the battery cell is in a normal, extended, or abnormal temperature range when the battery cell is fully charged. The charging method includes determining whether a battery cell is being charged, and if the battery cell is being charged, determining whether the battery cell is fully charged; if the battery cell is fully charged, determining whether a temperature of or around the battery cell is in a normal range or in an extended range; and if the temperature is in the normal range, selecting a first charging parameter set, and if the temperature is in the extended range, selecting a charging condition of the battery cell as a second set value.

11 Claims, 5 Drawing Sheets

(52) U.S. Cl.
CPC .............. *H02J 7/0091* (2013.01); *H02J 7/007* (2013.01); *H02J 7/0042* (2013.01); *H02J 7/0044* (2013.01); *H02J 7/0045* (2013.01); *H02J 7/0047* (2013.01); *H02J 7/0077* (2013.01); *H02J 7/0088* (2013.01); *Y02E 60/12* (2013.01)

(56) References Cited

U.S. PATENT DOCUMENTS

| | | | | |
|---|---|---|---|---|
| 5,231,872 | A * | 8/1993 | Bowler | B60C 23/007 340/445 |
| 5,629,601 | A * | 5/1997 | Feldstein | 320/119 |
| 5,635,816 | A * | 6/1997 | Welsh et al. | 320/102 |
| 5,670,863 | A * | 9/1997 | Broell et al. | 320/145 |
| 5,691,621 | A * | 11/1997 | Phuoc et al. | 320/134 |
| 5,955,869 | A * | 9/1999 | Rathmann | 320/132 |
| 5,965,997 | A * | 10/1999 | Alwardi et al. | 320/132 |
| 6,191,560 | B1 | 2/2001 | Sakakibara | 320/150 |
| 6,211,655 | B1 | 4/2001 | Hardie | |
| 6,577,104 | B2 * | 6/2003 | Sakakibara | 320/132 |
| 6,727,708 | B1 * | 4/2004 | Dougherty et al. | 324/427 |
| 7,034,507 | B2 * | 4/2006 | Lovett | 320/150 |
| 7,525,290 | B2 * | 4/2009 | Miyata | 320/160 |
| 8,076,904 | B2 * | 12/2011 | Nakano et al. | 320/132 |
| 8,164,468 | B2 * | 4/2012 | Gofman et al. | 340/636.2 |
| 8,248,033 | B2 * | 8/2012 | Nishi et al. | 320/132 |
| 8,258,756 | B2 * | 9/2012 | Lim | 320/155 |
| 8,305,043 | B2 * | 11/2012 | Yamamoto et al. | 320/150 |
| 8,368,345 | B2 * | 2/2013 | Wahlqvist et al. | 320/101 |
| 8,450,978 | B2 * | 5/2013 | Barsukov et al. | 320/136 |
| 8,473,231 | B2 * | 6/2013 | Plestid | 702/63 |
| 8,692,518 | B2 * | 4/2014 | Uchida et al. | 320/133 |
| 8,779,729 | B2 * | 7/2014 | Shiraishi | 320/155 |
| 2001/0001532 | A1 * | 5/2001 | Galbraith et al. | 320/132 |
| 2001/0017631 | A1 * | 8/2001 | Oakley | 345/660 |
| 2002/0006822 | A1 * | 1/2002 | Krintzman | 463/27 |
| 2002/0147943 | A1 * | 10/2002 | Slaugh et al. | 714/39 |
| 2004/0036445 | A1 * | 2/2004 | Trembley | 320/116 |
| 2004/0189257 | A1 * | 9/2004 | Dougherty et al. | 320/132 |
| 2005/0017687 | A1 * | 1/2005 | Nagaoka | 320/132 |
| 2005/0110466 | A1 * | 5/2005 | Shoji | 320/150 |
| 2005/0127877 | A1 * | 6/2005 | Tsuchiya et al. | 320/132 |
| 2005/0225301 | A1 * | 10/2005 | Arnold et al. | 320/150 |
| 2005/0275383 | A1 * | 12/2005 | Ishishita | 320/150 |
| 2006/0164041 | A1 * | 7/2006 | Ooshita et al. | 320/150 |
| 2006/0226812 | A1 * | 10/2006 | Patino et al. | 320/128 |
| 2007/0024246 | A1 * | 2/2007 | Flaugher | 320/150 |
| 2007/0120537 | A1 * | 5/2007 | Yamamoto | 320/150 |
| 2007/0139014 | A1 * | 6/2007 | Girson et al. | 320/132 |
| 2007/0278991 | A1 * | 12/2007 | Miyata | 320/104 |
| 2008/0054847 | A1 * | 3/2008 | Elias et al. | 320/130 |
| 2008/0191666 | A1 * | 8/2008 | Kernahan et al. | 320/150 |
| 2008/0191667 | A1 * | 8/2008 | Kernahan et al. | 320/150 |
| 2008/0284378 | A1 * | 11/2008 | Birke et al. | 320/149 |
| 2009/0072795 | A1 * | 3/2009 | Lovett | 320/150 |
| 2009/0295332 | A1 | 12/2009 | Yang et al. | |
| 2009/0295334 | A1 | 12/2009 | Yang et al. | |
| 2010/0007310 | A1 * | 1/2010 | Kawamoto et al. | 320/134 |
| 2010/0264883 | A1 * | 10/2010 | Aiura | 320/150 |
| 2011/0037437 | A1 * | 2/2011 | Lovett | 320/150 |
| 2011/0057624 | A1 * | 3/2011 | Rizzo | 320/152 |
| 2011/0148363 | A1 * | 6/2011 | Frisch et al. | 320/162 |
| 2011/0187329 | A1 * | 8/2011 | Majima et al. | 320/149 |
| 2011/0234173 | A1 * | 9/2011 | Kao et al. | 320/150 |
| 2011/0285356 | A1 * | 11/2011 | Maluf et al. | 320/139 |
| 2011/0298417 | A1 * | 12/2011 | Stewart et al. | 320/107 |
| 2012/0025771 | A1 | 2/2012 | Bhardwaj et al. | |
| 2012/0049804 | A1 * | 3/2012 | Kobayashi et al. | 320/150 |
| 2012/0065909 | A1 * | 3/2012 | Patino et al. | 702/63 |
| 2012/0081078 | A1 * | 4/2012 | Matsumura et al. | 320/134 |
| 2012/0153902 | A1 * | 6/2012 | Yebka et al. | 320/148 |
| 2012/0181991 | A1 * | 7/2012 | Gofman et al. | 320/150 |
| 2012/0194130 | A1 * | 8/2012 | Patino et al. | 320/112 |
| 2013/0207618 | A1 * | 8/2013 | Renken et al. | 320/155 |
| 2013/0257382 | A1 * | 10/2013 | Field et al. | 320/134 |
| 2013/0285619 | A1 * | 10/2013 | Teng et al. | 320/150 |
| 2013/0335012 | A1 * | 12/2013 | Meyer et al. | 320/107 |
| 2014/0028267 | A1 * | 1/2014 | Lee | 320/152 |

* cited by examiner

FIG. 2a
|  | First set value (Normal temperature range) | Second set value (Extended temperature range) |
|---|---|---|
| Voltage | 4.2V | 4.1V |
| Rate of Charge | 0.7C | 0.5C |
| RSOC | 100% | 80% |
FIG. 2b
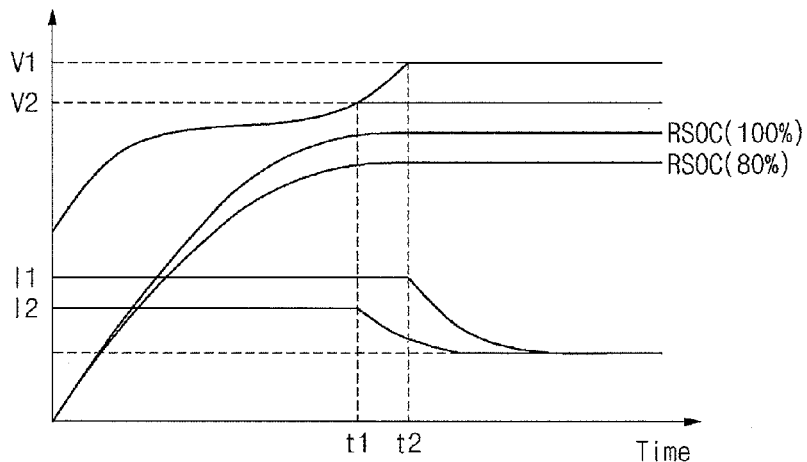
FIG. 2c
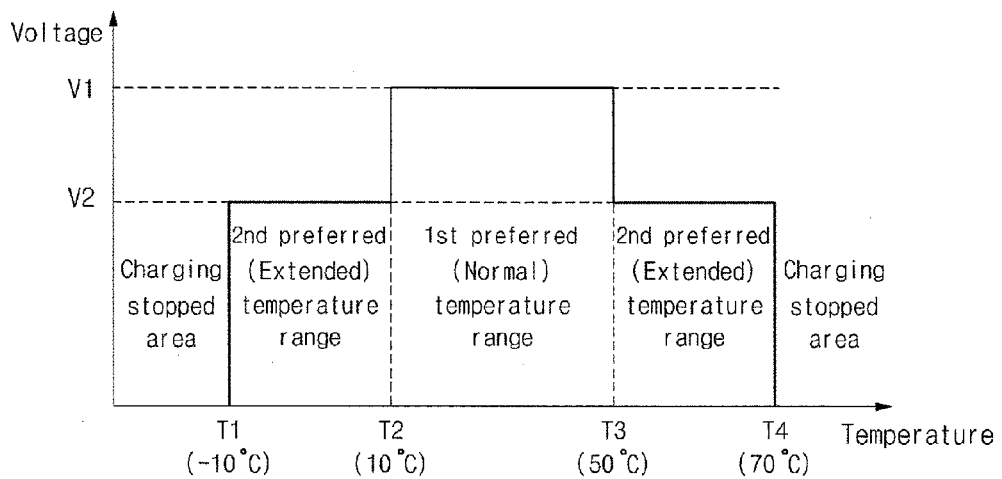

METHOD AND SYSTEM FOR CONTROLLING CHARGING PARAMETERS OF A BATTERY USING A PLURALITY OF TEMPERATURE RANGES AND COUNTERS AND PARAMETER SETS

CROSS-REFERENCE TO RELATED APPLICATIONS

This application claims the benefit of U.S. Provisional Application No. 61/676,220, filed Jul. 26, 2012, and which is incorporated by reference in its entirety.

BACKGROUND OF THE INVENTION

1. Field of the Invention

The present invention relates to a charging method of a battery and a battery pack thereof.

2. Description of the Related Technology

As portable electronic devices, such as cellular phones, smart phones, notebook type computers or the like, are increasing in complexity, functionality, and data usage, power consumption has correspondingly increased. Accordingly, the need for long battery life step in mobile environments is increasing. In recent years, lithium ion batteries having high energy densities are increasingly used as power supplies for portable electronic devices, and lithium ion batteries are generally manufactured in the form of a battery pack, in which one or more battery cells are contained in a housing.

During charging or discharging of a lithium ion battery, it is necessary to accurately control the charge/discharge voltage and the charge/discharge current. To this end, a microprocessor is generally installed within the battery pack. The microprocessor senses an internal state of the battery pack during charging or discharging and transmits sensed data to the main body of an electronic device or operates a protection circuit.

SUMMARY OF CERTAIN INVENTIVE ASPECTS

Aspects of the present disclosure provide a charging method of a battery, which can enhance the life characteristic of a battery cell by varying a charge set value (at least one of a charge voltage, a charge current and a battery capacity) if a temperature of or around the battery cell is in an extended range when the battery cell is fully charged.

Aspects of the present disclosure also provide a charging method of a battery, which can enhance the life characteristic of a battery cell by varying a charge set value if a charging time of the battery cell is larger than a reference time duration and a temperature of or around the battery cell is in an extended range.

Aspects of the present disclosure further provide a battery pack using the charging method.

Some embodiments described herein relate to a method of controlling charging parameters of a battery comprising providing a first charging parameter set and a second charging parameter set; determining whether the battery is being charged; sensing a battery temperature; comparing the sensed battery temperature to a first temperature range; incrementing a first count when the sensed battery temperature falls within the first temperature range and incrementing a second count when the sensed battery temperature falls outside the first temperature range; comparing the first and second count to a reference count; and selecting the first charging parameter set when the first count is greater than the reference count and selecting the second charging parameter set when the second count is greater than the reference count.

In some embodiments, the method comprises resetting the first count when the second count is greater than the reference count and resetting the second count when the first count is greater than the reference count.

In some embodiments, the first and second charging parameter sets comprise at least one of a charging voltage; a rate of charge; and a battery relative state of charge.

In some embodiments, the charging voltage for the first charging parameter set is higher than the charging voltage for the second charging parameter set.

In some embodiments, the method further comprises providing a second temperature range; comparing the sensed battery temperature range to the second temperature range; and wherein if the sensed battery temperature falls outside the second temperature range, stopping battery charging.

In some embodiments, the method further comprises sensing whether the battery is fully charged.

In some embodiments, the battery temperature is a temperature sensed at the battery pack.

In some embodiments, sensing the battery temperature comprises providing a charging reference time range; sensing a battery charging time; comparing the sensed battery charging time to the charging reference time; and when the sensed battery charging time is outside of the charging reference time range, measuring a battery temperature.

In some embodiments, the first and second charging parameter sets comprise at least one of a charging voltage; a rate of charge; and a battery relative state of charge.

In some embodiments, the method further comprises providing a second temperature range; comparing the sensed battery temperature range to the second temperature range; and wherein if the sensed battery temperature falls outside the second temperature range, stopping battery charging.

Some embodiments disclosed herein relate to a battery charging system comprising a battery; a battery charger configured to charge the battery; a temperature sensor configured to sense a temperature of the battery; a controller, wherein the controller is configured to communicate with the battery charger and the temperature sensor; determine whether the battery is being charged; receive a sensed battery temperature; compare the sensed battery temperature to a first temperature range; provide a first and second count; increment the first count when the sensed battery temperature falls within the first temperature range and increment a second count when the sensed battery temperature falls outside the first predetermined temperature range; compare the first and second charging frequency to the charging reference frequency; and select the first charging parameter set when the first charging number is greater than the charging reference number and select the second charging parameter set when the second charging frequency is greater than the charging reference frequency.

In some embodiments, the controller is further configured to determine whether a charging time of the battery is within a charging reference time range, and wherein the temperature sensor is further configured to sense a battery temperature when the charging time of the battery is outside of the charging reference time range.

BRIEF DESCRIPTION OF THE DRAWINGS

FIG. 2a is a table showing examples of first and second charging parameter sets in the charging method of the battery according to an embodiment of the present invention.

FIG. 2b is a graph illustrating voltage and current depending on the first and second charging parameter sets.

FIG. 2c is a graph illustrating voltages according to temperature ranges.

DETAILED DESCRIPTION

Exemplary embodiments will now be described more fully hereinafter with reference to the accompanying drawings. The embodiments described herein should not be construed as limited to the embodiments set forth herein. Rather, these embodiments are provided so that this disclosure will be thorough and complete, and will fully convey the scope of the invention to those skilled in the art.

As used herein, the term "and/or" includes any and all combinations of one or more of the associated listed items. The terminology used herein is for the purpose of describing particular embodiments only and is not intended to be limiting of the invention. As used herein, the singular forms "a", "an" and "the" are intended to include the plural forms as well, unless the context clearly indicates otherwise.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that, although the terms "first charging parameter set," "second charging parameter set," etc. may be used herein to describe particular contents, they should not be limited by these terms. These terms are only used to distinguish one value from another value.

Figure 1:
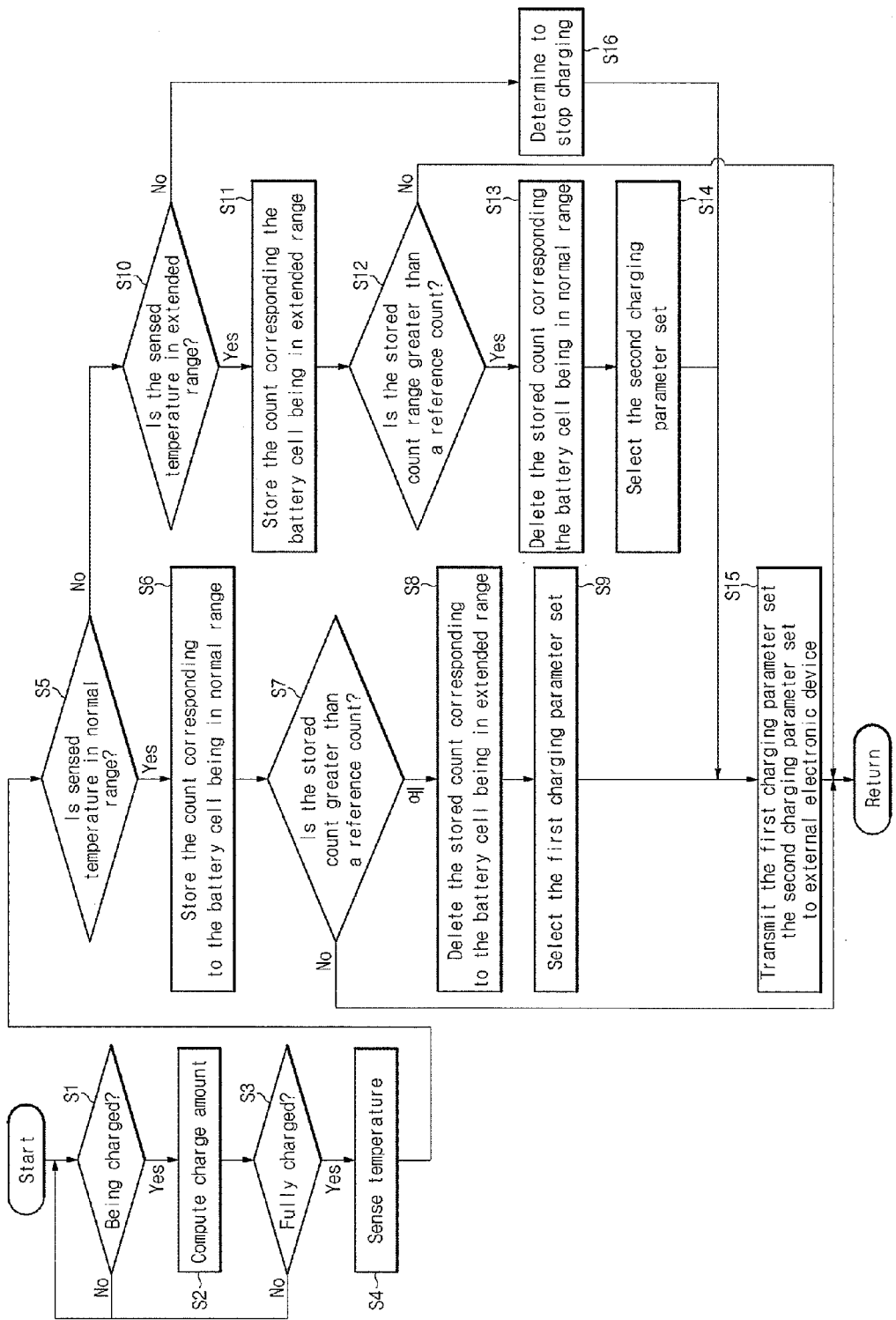
FIG. 1 is an embodiment of a flowchart illustrating a battery charging method.

FIG. 1 is a flowchart illustrating an embodiment of a battery charging method. As shown in FIG. 1, the battery charging method includes (S1) determining whether a battery cell is being charged, (S2) calculating a charge amount of the battery, (S3) determining whether the battery cell is fully charged, (S4) sensing a temperature of the battery cell, or around or in the vicinity of the battery cell, (S5) determining whether the sensed temperature is in a normal range, (S6) if the sensed temperature is in the normal range, storing a count corresponding to the battery cell being in the normal range, (S7) determining whether the count of the battery cell being in the normal range is greater than a reference count, (S8) if the count of the battery cell being in the normal range is greater than the reference count, deleting the count of the battery cell being in the extended range, (S9) selecting the charging condition as a first charging parameter set, (S10) if the sensed temperature is not in a normal range, determining whether the sensed temperature is in an extended range, (S11) if the sensed temperature is in the extended range, storing the count of the battery cell being in the extended range, (S12) determining whether the stored count corresponding to the battery cell being in the extended range is greater than a reference count, (S13) if the stored count corresponding to the battery cell being in the extended range is greater than the reference count, deleting the stored count corresponding to the battery cell being in the normal range, (S14) selecting the charging condition as a second charging parameter set, and (S15) transmitting the first charging parameter set or the second charging parameter set to an external electronic device, such as a mobile device in which the battery is disposed, or a device having a battery charging capability. In addition, the charging method according to an embodiment of the present invention may further include (S16) determining to stop charging if the sensed temperature is not in the normal or extended range.

In step S1, it is determined whether a battery cell connected to an external electronic device which includes a charger, is being charged. The determination may be made based on information obtained by a voltage sensor or a current sensor installed in the battery pack and/or a data line connected between the battery pack and the external electronic device. For example, if a voltage of the battery cell is increasing, as indicated by the voltage sensor, or if a charge current is being supplied, as indicated by the current sensor, the battery cell is considered being charged. If a signal indicative of charging is being transmitted from the external electronic device through the data line, the battery cell is considered being charged. If it is determined that the battery cell is currently being charged, step S2 may be performed.

In step S2, the relative state of charge of the battery cell is calculated. The calculation may be performed based on information obtained from the voltage sensor or the current sensor. For example, when the voltage sensor is used, the charge amount of the battery cell may be calculated based on the currently sensed voltage of the battery cell. This can be correlated to data about the relationship between the voltage and capacity of the battery cell. In addition, when the current sensor is used, the charge amount of the battery cell may be calculated based on the amount of current having passed through the current sensor.

In step S3, it is determined whether the battery cell is fully charged. The determining may be performed based on the information obtained by the voltage sensor or the current sensor provided in the battery pack. For example, in some embodiments, if the sensed voltage of the battery cell is approximately 4.2 V, the battery may be considered fully charged. When the current sensor is used, if the cumulative amount of current having passed through the current sensor exceeds a preset cumulative current amount, the battery cell may be considered fully charged. The current embodiment describes sensing voltage and/or current; however, these are provided only for illustration, and aspects of the present disclosure are not limited thereto.

In step S4, the temperature of the battery cell, or around or in the vicinity of the battery cell is sensed by a temperature sensor. The temperature sensor may be a general negative temperature coefficient (NTC) or a positive temperature coefficient (PTC), a thermocouple thermometer, a temperature detecting resistor, a metal thermometer, and so on, and aspects of the present disclosure are not limited thereto.

The temperature of the battery cell may mean a temperature sensed by a temperature sensor directly attached to the battery cell, and the temperature around or in the vicinity of the battery cell may mean a temperature sensed at a location not directly attached to the battery cell.

Steps S1 through S4 need not be performed in the order recited here, but could be performed in any logical order. In some embodiments, step S2 is performed before step S3, but step S3 need not be performed immediately following step S2.

In step S5, it is determined whether the sensed temperature of the battery, or around or in the vicinity of the battery cell is in the normal range. In some embodiments, the normal range may be from approximately 10° C. to approximately 50° C. These numeric values are provided only for illustration, and aspects of the present invention are not limited thereto. That is to say, the normal range may vary according to characteristics of the battery cell or customer's request. If it is determined that the sensed temperature of the battery cell, or around or in the vicinity of the battery cell is in the normal range, step S6 is performed.

Sensing the temperature of the battery in step S6 may occur at various intervals throughout the battery charging process. For example, sensing may occur only upon initiating charging. In some embodiments, sensing the battery temperature or the temperature around or in the vicinity of a battery may occur upon initiating charging and at a specified interval thereafter, e.g., every half-hour or every hour.

In step S6, if the sensed temperature is in the normal range, a count corresponding to the battery cell being in the normal range is incremented, and the incremented count is stored. To increment the count corresponding to the battery cell being in the normal range the a 1 is added to the presently stored count corresponding to the battery cell being in the normal range. For example, if the presently stored number of times is 1, and the battery temperature sensed is in the normal range, the count is incremented and stored as 2.

In step S7, it is determined whether the count corresponding to the battery cell being in the normal range is greater than a reference count. In some embodiments, the reference count may be approximately 3 times to 6, but aspects of the present invention are not limited thereto. That is to say, the reference count may vary according to characteristics of the battery cell or a customer's request. However, if the reference count is less than 3, it may be difficult to accurately estimate the frequency with which the battery cell is exposed to the normal temperature range. In addition, if the reference count is greater than 6, the charging parameter set used based on the battery cell the battery cell is being in the normal temperature range or not may be changed too late. If the count corresponding to the battery cell being in the normal range is greater than the reference count, step S8 is performed.

In step S8, a stored count corresponding to the battery cell being in the extended range is deleted. For example, if the pre-stored count corresponding to the battery cell being in the extended range is 2, the present count corresponding to the battery cell being in the extended range is stored as 0. Of course, if there is no pre-stored count corresponding to the battery cell being in the extended range, step S8 may be omitted.

In step S9, the battery charging parameters are selected. If the count corresponding to the battery cell being in the normal range is greater than the reference count, the charging parameters are selected as a first charging parameter set. The first charging parameter set may include parameters such as charging voltage, charging current, rate of charge, relative state of charge, or a battery capacity. As will be described later, the first charging parameter set may be greater, or may have higher values for each parameter, than the second charging parameter set.

Changing the charging parameter set allows for the charging parameters to be optimized for the temperature conditions at or around the battery during charging. For example, if the temperature has been out of the normal range, but during charging, is counted in the normal range a sufficient number of times, as described herein, the battery charger will be instructed to change the charging parameters optimized for the normal range during the charging process. The battery charging parameters may be predetermined and provided in the battery pack or in the device in which the battery is disposed. This change of parameters can result in greater charging efficiency and prolonged battery life.

In step S10, if the sensed temperature is not in the normal range according to step S5, it is determined whether the sensed temperature is in an extended range, or in an abnormal range. The extended range may be a range of values on either side of the normal temperature range. For example, the extended range may be from approximately −10° C. to 10° C., and about 50° C. to about 70° C. These numeric values are provided only for illustration, and aspects of the present invention are not limited thereto. That is to say, the extended range may vary according to characteristics of the battery cell or a customer's request. If it is determined that the sensed temperature of or around the battery cell is in the extended range, step S11 is performed.

In step S11, the count corresponding to the battery cell being in the extended range incremented, and the incremented count is stored. To increment the count corresponding to the battery cell being in the extended range, a 1 is added to the presently stored count corresponding to the battery cell being in the extended range. For example, if the presently stored count corresponding to the battery cell being in the extended range is 1, and the battery temperature sensed is in the extended range, the count is incremented and stored as 2.

In step S12, it is determined whether the count corresponding to the battery cell being in the extended range is greater than a reference count. Here, the reference count may be approximately 3 times to 6 times, but aspects of the present invention are not limited thereto. That is to say, the reference number of times may vary according to characteristics of the battery cell or a customer's request. If the reference number of times is less than 3, it may be difficult to accurately estimate the frequency with which the battery cell is exposed to the extended temperature range. In addition, if the reference count is greater than 6, the change in the charging parameter set may occur at a point where. If the count corresponding to the battery cell being in the extended range is greater than the reference number of times, step S13 is performed.

In step S13, if the stored count corresponding to the battery cell being in the extended range is greater than the reference count, the stored count corresponding to the battery cell being in the normal range is deleted. For example, if the pre-stored number of times the battery cell is in the normal range is 2, the present number of times the battery cell is in the normal range is stored as 0. Of course, if there is no pre-stored count corresponding to the battery cell being in the normal range, step S13 may be omitted.

In step S14, the battery charging parameters are selected. If the count corresponding to the battery cell being in the extended range, a second charging parameter set is selected. The second charging parameter set may include the same parameters as the first charging parameter set, e.g., charging voltage, a charging current, relative state of charge, or battery capacity. As described above, the second charging parameter set may be smaller than the first charging parameter set.

If it is determined in step S10 that the sensed temperature is not in the extended range, the sensed temperature may be determined to be in an abnormal range, and step S16 is performed. That is to say, in step S16, it is determined to stop charging of the battery cell if the sensed temperature is not in the extended range. The abnormal range may be the range of temperatures on either side of the extended range. For example, the sensed temperature may be in the abnormal range if the sensed temperature is less than about −10° C. and greater than about 70° C. In the abnormal range, the potential exists for damaging the battery or shortening battery life if charging occurs at these temperatures. It is understood that these numeric values are provided only for illustration, and aspects of the present disclosure are not limited thereto.

In step S15, the first charging parameter set, the second charging parameter set or a charging stop signal is transmitted to an electronic device or a battery charger. That is to say, since the battery cell is charged by the electronic device including a charger, the first charging parameter set, the second charging parameter set or the charging stop signal is transmitted to the charger. Then, the charger charges the battery cell by adjusting the charge voltage, the charge current or the battery capacity, and/or other charging parameters adjusted based on the first charging parameter set or the second charging parameter set. If the charging stop signal is applied to the charger, the charger stops charging of the battery cell.

As described above, in the charging method of the battery according to the present invention, when the battery cell is fully charged, the charge set value is changed according to the temperature of the battery cell, or the temperature around or in the vicinity of the battery cell, thereby enhancing the life characteristic of the battery cell. Of course, the charge set value may be substantially adopted in the next charging cycle of the battery cell.

In addition, in the charging method of the battery according to one embodiment of the present invention, if the count corresponding to the battery cell being in either the normal, or extended temperature range is consecutively in the normal range or in the extended range greater than the reference count, the charging parameters are changed, thereby further enhancing the life characteristic of the battery cell. If the charging parameters were set to be changed on a real time basis, based on continuous real-time temperature monitoring, irrespective of the number of times the temperature is in the normal range or in the extended range, the charging parameter set may be changed too often, thereby deteriorating the life characteristic of the battery cell. Further, if the charging parameters are set to be changed on a real time basis, irrespective of the number of times the temperature is in the normal range or in the extended range, the capacity of the battery cell may seem to have been reduced when the battery cell is charged in the normal range, rather than in the extended range.

As disclosed herein, the number of successive intervals wherein the battery cell is in a particular temperature range, or the frequency with which the battery cell is in the normal range or in the extended range is counted, incremented, and stored Only when the count, or the number of successive intervals or the frequency exceeds a reference count, the charging parameters are changed, so that the charging parameters more suitable battery condition can be provided, thereby preventing the battery capacity from being unnecessarily reduced and enhancing the life characteristic of the battery cell.

Figure 2D:
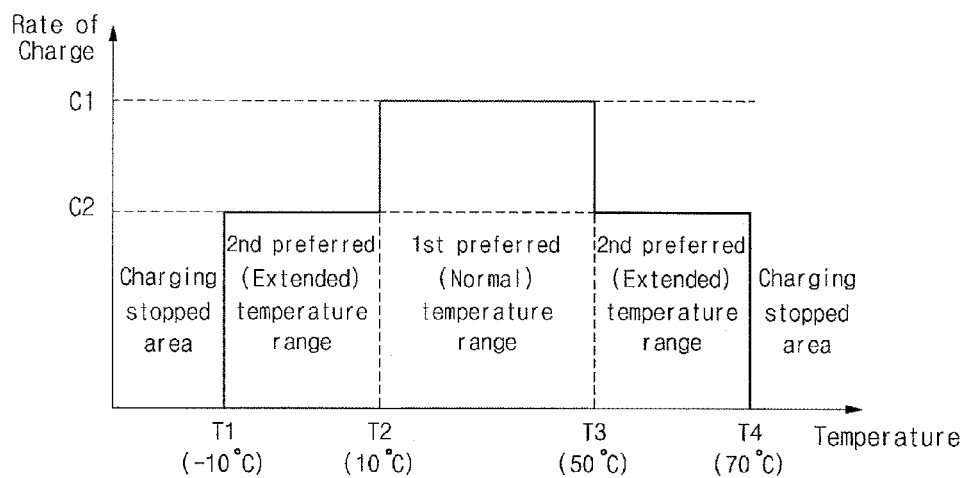
FIG. 2d is a graph illustrating rate of charge according to temperature ranges.

FIG. 2a is a table showing examples of the first and second charging parameter sets in an embodiment of the battery charging method. FIG. 2b is a graph illustrating voltage and current depending on the first and second charging parameter sets, and FIG. 2c is a graph illustrating voltages according to temperature ranges.

As shown in FIG. 2a, the first charging parameter set may be adopted in the normal temperature range, and may include a charge voltage, a rate of charge or/and a battery capacity represented by a relative state of charge (RSOC). For example, the charge voltage may be set to 4.2 V, the rate of charge may be set to 0.7 hr$^{-1}$, and RSOC may be set to 100%. These numeric values are provided only for illustration, and aspects of the present invention are not limited thereto. In addition, the second charging parameter set may be adopted in the extended temperature range, and may include a charge voltage, a rate of charge or/and a battery capacity represented by RSOC. For example, the charge voltage may be set to 4.1 V, the charge current may be set to 0.5 hr$^{-1}$, and RSOC may be set to 80%. These numeric values are provided only for illustration, and aspects of the present invention are not limited thereto.

Further, while two sets of charging parameters have been described with regard to first and second charging parameter sets according to the sensed temperature, the present disclosure is not limited thereto. That is to say, the temperature range may be subdivided into different ranges, each with a corresponding set of charging parameters.

As shown in FIG. 2b, for example, in a case of a constant-current constant-voltage charging method, the first and second charging parameter sets may be set to different levels. That is to say, the first charging parameter set may be a relatively high charge voltage V1 or a relatively high charge current I1, and the second charging parameter set may be a relatively low charge voltage V2 or a relatively low charge current I2. As described above, in the normal temperature range, a constant voltage is supplied until the relatively high charge voltage V1 is reached, and a constant current is supplied until the relatively high charge current I1 is reached. In addition, in the extended temperature range, a constant voltage is supplied until the relatively low charge voltage V2 is reached, and a constant current is supplied until the relatively low charge current I2 is reached. The constant voltage and the constant current, which are relatively low, are supplied to the battery cell in the extended temperature range, thereby enhancing the life characteristic of the battery cell.

In addition to the constant-current constant-voltage charging method, a pulse charging method or a constant-current pulse charging method may also be employed. In the pulse charging method, the first and second charging parameter sets may be set such that pulse charge current values thereof are different from each other. In the constant-current pulse charging method, the first and second charging parameter sets may be set such that a constant current values and pulse charge current values thereof are different from each other.

As shown in FIG. 2c, when the temperature is in a range between T2 (10° C.) and T3 (50° C.)., that is, in the normal range, the relatively high charge voltage V1 is supplied. When the temperature is in a range between T1 (−10° C.) and T2 (10° C.)., or between T3 (50° C.) and T4 (70° C.)., that is, in the extended range, the relatively low charge voltage V2 may be supplied. When the temperature is lower than T1 or higher than T4, charging of the battery cell is stopped, thereby preventing the life characteristic of the battery cell from being abruptly lowered.

As shown in FIG. 2c, when the temperature is in a range between T2 (10° C.) and T3 (50° C.)., that is, in the normal range, the relatively high rate of charge C1 is supplied. When the temperature is in a range between T1 (−10° C.) and T2 (10° C.)., or between T3 (50° C.) and T4 (70° C.)., that is, in the extended range, the relatively low rate of charge C2 may be supplied. When the temperature is lower than T1 or higher than T4, charging of the battery cell is stopped, thereby preventing the life characteristic of the battery cell from being abruptly lowered.

Figure 2E:
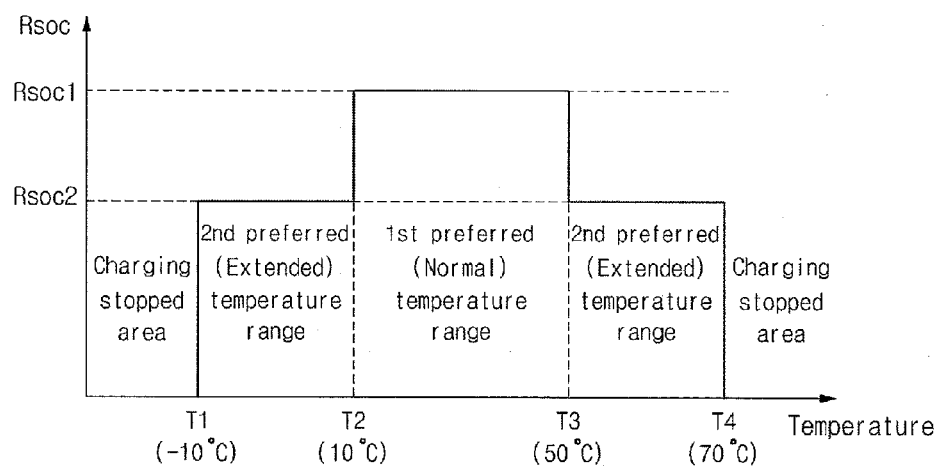
FIG. 2e is a graph illustrating relative state of charge of a battery according to temperature ranges.

As shown in FIG. 2e when the temperature is in a range between T2 (10° C.) and T3 (50° C.)., that is, in the normal range, the relatively high relative state of charge RSOC1 is set. When the temperature is in a range between T1 (−10° C.) and T2 (10° C.), or between T3 (50° C.) and T4 (70° C.), that is, in the extended range, the relatively low relative state of charge RSOC2 may be set. When the temperature is lower than T1 or higher than T4, charging of the battery cell is stopped, thereby preventing the life characteristic of the battery cell from being abruptly lowered.

Figure 3:
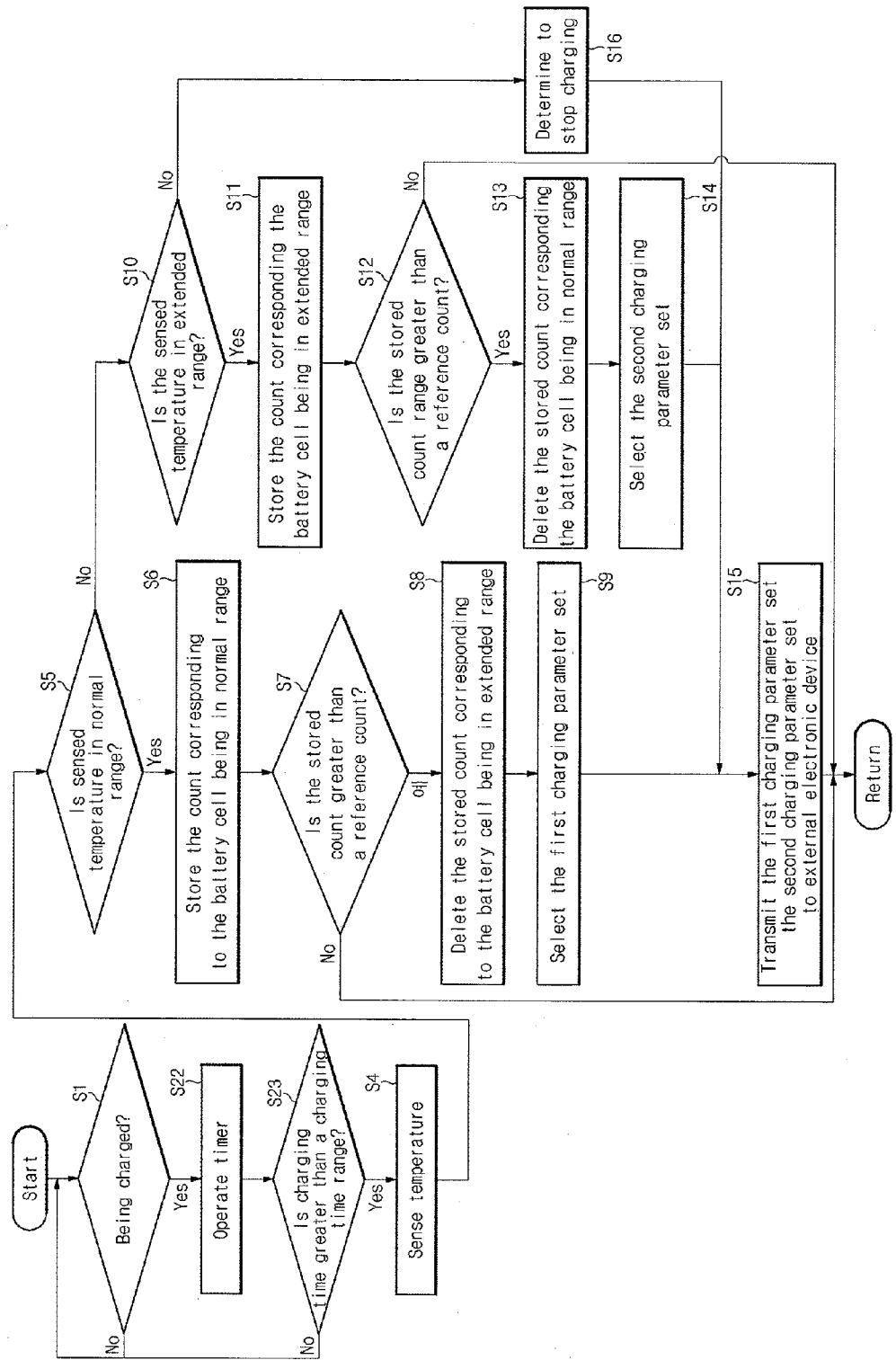
FIG. 3 is a flowchart illustrating an embodiment of a charging method of a battery.

FIG. 3 is a flowchart illustrating an embodiment of a method of charging a battery.

As shown in FIG. 3, another embodiment of a battery charging method is disclosed. The following description will focus on differences between the charging methods according to the present and previous embodiments.

Referring to FIG. 3, if it is determined in step S1 that the battery cell is being charged, step S22 is performed to initiate operation of a timer. The timer is operated to identify a charging time of the battery cell.

Thereafter, it is determined whether the charging time is greater than a charging reference time range S13. Here, the charging reference time range may be in a range of, for example, approximately 30 minutes to 90 minutes. However, this range is provided only for illustration and aspects of the present invention are not limited thereto. If the reference time duration is less than 30 minutes or greater than 90 minutes, the period of changing the charging parameter set may be too short or too long, and may result in lowering the life characteristic of the battery cell. In step S13, if it is determined that the charging time is greater than the charging reference time range, step S4 is performed to sense a temperature.

Although described in a particular order above, steps S1, S22, S23, and S4 may be performed in any order, except that step S22 is performed before step S23, although step S23 need not follow immediately after step S22.

The following steps may be performed as described elsewhere herein, for example, as described with reference to FIG. 1. In some embodiments, insteps S7 and S11, the reference count may be set to approximately 20 to 120. These numeric values are provided only for illustration, but aspects of the present invention are not limited thereto. If the reference number of times is less than 20 times, the period of changing the charging parameter set may become too short. If the reference number of times is greater than 120 times, the period of changing the charge set value may become too long.

As described above if the charging time of the battery cell is greater than the charging reference time range, the charging parameter set is changed according to the sensed temperature, thereby enhancing the life characteristic of the battery cell. In some embodiments, even if the battery cell is not fully charged yet, the charging parameter set may be changed according to the charging time of the battery cell or the count corresponding to the battery cell being in the normal range or the extended range, thereby further enhancing the life characteristic of the battery cell.

In addition, the embodiments illustrated in FIGS. 1 and 3 may be implemented together. That is to say, after performing step S23 of determining whether the charging time shown in FIG. 3 is greater than the reference time duration, step S2 of calculating a charge amount and step S3 of determining whether the battery cell is fully charged may be performed. Therefore, in some embodiments, whenever the temperature is sensed for each charging time, the next charge set value may be determined according to the count corresponding to the battery cell being in the normal range or in the extended range, or whenever the battery cell is fully charged, the charging parameter set of the battery cell may be determined, thereby more accurately estimating the proper charging parameters for the battery cell and further enhancing the life characteristic of the battery cell.

Figure 4:
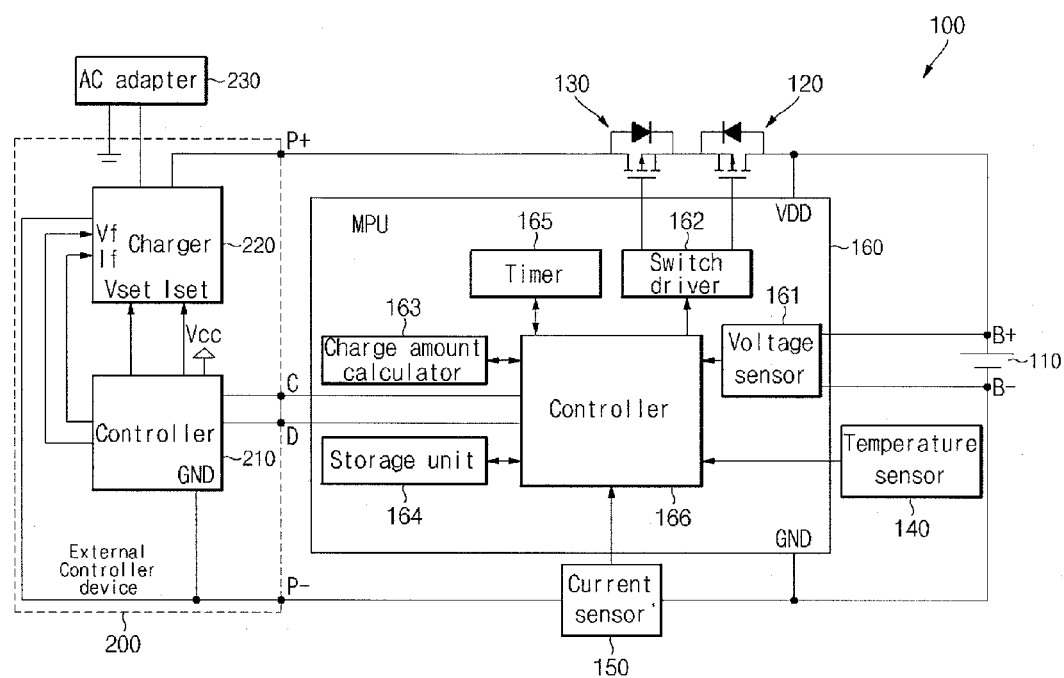
FIG. 4 is an embodiment of a block diagram of a battery pack.

FIG. 4 is a block diagram of an embodiment of a battery pack 100.

As shown in FIG. 4, the battery pack 100 includes a battery cell 110, a charge switch 120, a discharge switch 130, a temperature sensor 140, a current sensor 150 and a microprocessor unit (MPU) 160. In addition, the battery pack 100 is connected to an external electronic device 200 through pack terminals P+ and P− and communication terminals C and D. Here, the external electronic device 200 may include, for example, a chargeable mobile smart phone, a notebook computer, and so on. Of course, the external electronic device 200 may be the charger 220 itself.

The battery cell 110 may be a general rechargeable secondary battery, such as a lithium ion battery, a lithium ion polymer battery, or the like, but is not limited thereto. The battery cell 110 may also be, for example, a liquid metal battery. Although only a single battery cell 110 is shown in the drawing, it may include a plurality of battery cells connected to each other in series or parallel.

The charge switch 120 may be installed between a positive electrode terminal B+ of the battery cell 110 and a pack positive electrode terminal P+. When the battery cell 110 is overcharged, the charge switch 120 is turned off by a control signal of the MPU 160, thereby preventing the battery cell 110 from being overcharged. The charge switch 120 may be a general MOSFET or a relay, but not limited thereto.

The discharge switch 130 may also be installed between the positive electrode terminal B+ of the battery cell 110 and the pack positive electrode terminal P+. When the battery cell 110 is overcharged, the discharge switch 130 is turned off by a control signal of the MPU 160, thereby preventing the battery cell 110 from being overcharged. The discharge switch 130 may be a general MOSFET or a relay, but not limited thereto. The temperature sensor 140 may be directly attached to the battery cell 110 or installed in the vicinity of the battery cell 110 to sense the temperature of or around the battery cell 110 to then transmit the sensed temperature to the MPU 160. As described above, the temperature sensor 140 may be, for example, a thermistor, but not limited thereto.

The current sensor 150 may be installed between a negative electrode terminal B− of the battery cell 110 and a pack negative electrode terminal P−. The current sensor 150 may sense a charge current and a discharge current of the battery cell 110 and then transmit the sensed current to the MPU 160. The current sensor 150 may be a general resistor, but not limited thereto.

The MPU 160 includes a voltage sensor 161, a switch driver 162, a charge amount calculator 163, a storage unit 164, a timer 165 and a controller 166. The voltage sensor 161, which is connected to the battery cell 110 in parallel, senses a voltage of the battery cell 110, converts the same into a digital signal and then transmits the digital signal to the controller 166. The current obtained from the current sensor 150 and the temperature obtained from the temperature sensor 140 are also converted into digital signals to then be transmitted to the controller 166. In addition, the switch driver 162 allows the charge switch 120 and/or the discharge switch 130 to be turned on or off by the control signal of the controller 166. Controller 166 controls the switch driver 162 based on the information obtained from the temperature sensor 140, the current sensor 150 and the voltage sensor 161. For example, the controller 166 controls the charge switch 120 and/or the discharge switch 130 to be turned on or off by transmitting the control signal to the switch driver 162 based on the information obtained from the temperature sensor 140 when the battery cell 110 is at a predetermined temperature (for example, less than −10° C. or greater than 70° C.). In addition, when it is determined that an overcurrent flows in the battery cell 110 based on the information obtained from the current sensor 150, the controller 166 transmits the control signal to the switch driver 162 to allow the charge switch 120 or the discharge switch 130 to be turned on or off. In addition, when it is determined based on the information obtained from the voltage sensor 161 that the battery cell 110 is overcharged and/or overdischarged, the controller 166 transmits the control signal to the switch driver 162 to allow the charge switch 120 or the discharge switch 130 to be turned off.

Based on the information obtained from the voltage sensor 161, the charge amount calculator 163 calculates a charge amount of the battery cell 110. To this end, the information about the charge amount relative to the voltage of the battery cell 110 is pre-stored in the storage unit 164.

As described above, the storage unit 164 may store the charge amount relative to the voltage of the battery cell 110, the normal range, the extended range, or in an abnormal range, the number of times the battery cell 110 is in the normal range, the number of times the battery cell 110 is in the extended range, first and second charging parameter sets, a reference time duration, and so on. The stored data may be supplied to the controller 166 when the controller 166 requires the data. In addition, a program or software for implementing the charging methods shown in FIGS. 1 and 3 may be stored in the storage unit 164.

The timer 165 measures a charging time of the battery cell 110 and transmits the same to the controller 166.

Meanwhile, as described above, the controller 166 operates the switch driver 162 based on the information obtained from the temperature sensor 140, the current sensor 150 and the voltage sensor 161, or transmits the first charging parameter set in the normal range and/or the second charging parameter set in the extended range to the external electronic device 200 through the communication terminals C and D.

In some embodiments, the voltage sensor 161 and the switch driver 162 may be controlled by a separately provided analog front end as the number of battery cells 110 increases. Furthermore, the MPU 160 and the analog front end may be separately provided or may be implemented as a single chip.

The external electronic device 200 includes a controller 210 and a charger 220. The controller 210 transmits data, for example, a charge voltage Vset and a charge current Iset of the battery pack 100 to the charger 220 based on the first charging parameter set or the second charging parameter set obtained from the communication terminals C and D. Then, the charger 220 supplies a charge voltage and a charge current corresponding to the data of the charge voltage Vset and the charge current Iset to the battery pack 100. In addition, the controller 210 transmits a voltage, Vf, and a current, If, fed back from the battery pack 100 to the charger 220. This feedback may also control the charger 220 to charge the battery cell 110. An AC adapter 230 may be connected to the charger 220.

The battery pack 100 shown in FIG. 4 is provided by way of example of implementing the battery charging method as disclosed herein, and the battery charging method of the present invention can be implemented in various ways or by using various structures. For example, the charger installed in the external electronic device may be provided in the battery pack. In addition, the controller installed in the external electronic device may directly receive the information of the temperature, voltage and current of the battery pack and may determine and select one of the first charging parameter set or the second charging parameter set for charging the battery.

As described above, the battery pack 100 according to the present invention may identify whether the battery cell 110 is mainly charged in the normal range or in the extended range, and may determine a suitable charging parameter set (a charge voltage, a charge current, a charging rate, a relative state of charge, or a battery capacity). In addition, the determined charge set value is transmitted to the external electronic device 200 through the communication terminals C and D. Then, the charger 220 of the external electronic device 200 supplies the charge voltage and the charge current suitable to the determined charge set value and charges the battery cell 110 until a predetermined battery capacity is reached. Therefore, the battery pack 100 may provide an enhanced life characteristic of the battery cell 110.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A method of controlling charging parameters of a battery comprising:
   providing a first charging parameter set and a second charging parameter set;
   determining whether the battery is being charged;
   sensing a battery temperature;
   comparing the sensed battery temperature to a first temperature range;
   incrementing a first count when the sensed battery temperature falls within the first temperature range and incrementing a second count when the sensed battery temperature falls outside the first temperature range;
   comparing the first and second count to a reference count;
   resetting the first count when the second count is greater than the reference count and resetting the second count when the first count is greater than the reference count; and
   selecting the first charging parameter set when the first count is greater than the reference count and selecting the second charging parameter set when the second count is greater than the reference count.

2. The method of claim 1, wherein the first and second charging parameter sets comprise at least one of:
   a charging voltage;
   a rate of charge; and
   a battery relative state of charge.

3. The method of claim 2, wherein the charging voltage for the first charging parameter set is higher than the charging voltage for the second charging parameter set.

4. The method of claim 1, further comprising
   providing a second temperature range;
   comparing the sensed battery temperature range to the second temperature range; and
   wherein if the sensed battery temperature falls outside the second temperature range, stopping battery charging.

5. The method of claim 1, further comprising sensing whether the battery is fully charged.

6. The method of claim 1, wherein the battery temperature is a temperature sensed at the battery pack.

7. The method of claim 1 wherein sensing the battery temperature comprises:
   providing a charging reference time range;
   sensing a battery charging time;
   comparing the sensed battery charging time to the charging reference time; and when the sensed battery charging time is outside of the charging reference time range, measuring a battery temperature.

8. The method of claim 7, wherein the first and second charging parameter sets comprise at least one of:
   a charging voltage;
   a rate of charge; and
   a battery relative state of charge.

9. The method of claim 7, further comprising
   providing a second temperature range;
   comparing the sensed battery temperature range to the second temperature range; and
   wherein if the sensed battery temperature falls outside the second temperature range, stopping battery charging.

10. A battery charging system comprising:
    a battery;
    a battery charger configured to charge the battery;
    a temperature sensor configured to sense a temperature of the battery;
    a microcontroller, wherein the microcontroller is configured to:
       communicate with the battery charger and the temperature sensor;
       determine whether the battery is being charged;
       receive a sensed battery temperature;
       compare the sensed battery temperature to a first temperature range;
       provide a first and second count;
       increment the first count when the sensed battery temperature falls within the first temperature range and increment a second count when the sensed battery temperature falls outside the first predetermined temperature range;
       compare the first and second charging frequency to the charging reference frequency;
       resetting the first count when the second count is greater than the reference count and resetting the second count when the first count is greater than the reference count; and
       select the first charging parameter set when the first charging number is greater than the charging reference number and select the second charging parameter set when the second charging frequency is greater than the charging refereance frequency.

11. The battery charging system of claim 10, wherein the microprocessor is further configured to determine whether a charging time of the battery is within a charging reference time range, and wherein the temperature sensor is further configured to sense a battery temperature when the charging time of the battery is outside of the charging reference time range.

* * * * *